United States Patent
Jürgensen et al.

(10) Patent No.: US 7,457,370 B2
(45) Date of Patent: Nov. 25, 2008

(54) FREQUENCY STAGGERED FREQUENCY SHIFT KEYING MODULATION

(75) Inventors: Jens-Uwe Jürgensen, Munich (DE); Richard Stirling-Gallacher, Esslingen (DE)

(73) Assignee: Sony Deutschland GmbH, Cologne (DE)

( * ) Notice: Subject to any disclaimer, the term of this patent is extended or adjusted under 35 U.S.C. 154(b) by 570 days.

(21) Appl. No.: 11/101,055

(22) Filed: Apr. 6, 2005

(65) Prior Publication Data
US 2005/0226348 A1 Oct. 13, 2005

(30) Foreign Application Priority Data
Apr. 7, 2004 (EP) .................... 04008468

(51) Int. Cl.
*H04L 27/10* (2006.01)
(52) U.S. Cl. .................. 375/272; 375/260; 375/271; 375/295; 375/316; 455/427; 398/76; 398/182
(58) Field of Classification Search .............. 375/132, 375/136, 259–260, 267–269, 272–273, 303–304, 375/334, 339; 398/76, 182
See application file for complete search history.

(56) References Cited
U.S. PATENT DOCUMENTS
2003/0147655 A1 * 8/2003 Shattil ................... 398/182
2003/0153308 A1 * 8/2003 Karabinis ................ 455/427
2005/0018783 A1 * 1/2005 Nakache et al. ........... 375/260
2005/0111346 A1 * 5/2005 Santhoff et al. ........... 370/203

OTHER PUBLICATIONS

John G. Proakis: "Digital Communications" Jan. 1, 2001, Mc Graw Hill, New York, XP000864285.

* cited by examiner

*Primary Examiner*—Shuwang Liu
*Assistant Examiner*—Hirdepal Singh
(74) *Attorney, Agent, or Firm*—Oblon, Spivak, McClelland, Maier & Neustadt, P.C.

(57) ABSTRACT

A frequency modulation method is proposed that enables an imprinting of a digital message formed by a sequence of symbols on a set of frequency bands. Each symbol of the digital message is hereby assigned just one symbol value out of a defined set of symbol values. According to the method at least two symbol transmission channels are defined with each symbol transmission channel being formed by a sub-set of frequency bands selected from the set of frequency bands and with each frequency band of a symbol transmission channel being allocated to a symbol value of the set of symbol values in a one-to-one relation such, that the symbol transmission channels defined differ from each other in at least one frequency band selected and/or in an allocation of a frequency band to a symbol value. Further, each of the defined symbol transmission channels is successively modulated with a single symbol value of the digital message according to the channel allocation scheme of the respective symbol transmission channel.

11 Claims, 7 Drawing Sheets

FREQUENCY STAGGERED FREQUENCY SHIFT KEYING MODULATION

BACKGROUND OF THE INVENTION

Frequency shift keying (FSK) is a digital modulation scheme. In the simple case of binary frequency shift keying e.g., the carrier wave frequency shifts between two frequencies for modulating the two symbol values of a binary digital baseband message. The term symbol denotes an element of a message. The symbol can take on only certain values, so called symbol values which are defined by the underlying digital system. A message is an assembly of symbols representing certain information.

A demodulation of a FSK modulated signal is done by a receiver which sequentially detects the received frequencies and translates these in the respective original symbol values. The demodulation can be implemented coherently or non-coherently.

A typical binary FSK receiver for coherent demodulation is shown in FIG. 1. The signal received at the antenna is band-pass filtered before being amplified by a low noise amplifier (LNA). The amplified signal may then be passed on to a down converter for translating the carrier frequencies to lower values. There are various forms of down converters and in some situations the down converter may also be omitted. The output of the down converter is then split and each component is mixed with a different oscillator frequency. For the binary FSK receiver of FIG. 1, the possibly down converted signal is split in two components with one being mixed with an oscillator frequency F1 and the other with an oscillator frequency F2. Each mixed component is supplied to a separate integrator which outputs are then compared for achieving a decision on the symbol value at the correct sampling time.

Non-coherent FSK receivers use baseband filters instead of e.g. phase coherent oscillators as shown in FIG. 2. In contrast to coherent detection, the decision on the symbol value is based on the detected baseband envelope instead of the integrator output for the coherent receiver.

When there are M frequencies used for a transmission of a digital message instead of only two, the modulation scheme is known a M-ary FSK, and there are M possibly transmitted signals. The number M of frequencies used for modulating a digital message defines the maximum number of possible symbol values allowed for a digital message to be modulated by an M-ary FSK system. But by modulating only a binary digital message, the transmission data rate increases due to the increased bandwidth resulting from the increased number of transmission frequencies.

Currently a variety of different FSK modulation techniques are known like e.g. Continuous Phase FSK (CFSK), Sunde's FSK and M-ary Orthogonal FSK as described in WO 03/0288255. CFSK is a form of FSK, in which there are no phase discontinuities in the transmitted signal. The transmitter can therefore be implemented as a single oscillator that is modulated by a data stream. Depending on the separation of the frequencies used to represent the individual symbol values, a respective system is referred to as norrowband or wideband system. A Sunde's FSK uses two frequencies for representing two symbol values, whereby the separation of the frequencies is the reciprocal of the data rate. In a M-ary Orthogonal FSK, M frequencies are used with the separation of the frequencies being the reciprocal of the data rate.

The known FSK communication systems use a fixed assignment of the transmission frequencies to the symbol values which may lead to signal interference particularly for a multipath propagation of the carrier wave and to a high bit error rate.

It is therefore an object of the present invention to provide a FSK modulation technique resulting in a reduced bit error rate.

SUMMARY OF THE INVENTION

The above object is achieved by the invention as defined in the independent claims. Advantageous embodiments of the present invention are the subject of other claims.

According to the invention a frequency modulation method is disclosed, which enables an imprinting of a digital message formed by a sequence of symbols on a set of frequency bands. Each symbol of the digital message is hereby assigned just one symbol value out of a defined set of symbol values. According to the method, at least two symbol transmission channels are defined with each symbol transmission channel being formed by a sub-set of frequency bands selected from the set of frequency bands and with each frequency band of a symbol transmission channel being allocated to a symbol value of the set of symbol values in a one-to-one relation such, that the symbol transmission channels defined differ from each other in at least one frequency band selected and/or in an allocation of a frequency band to a symbol value. Further, each of the defined symbol transmission channels is successively modulated with a single symbol value of the digital message according to the channel allocation scheme of the respective symbol transmission channel.

The invention is further represented by a conversion controller for a frequency shift keying transmitter and for a frequency shift keying receiver which is equipped with a symbol transmission channel definition means, an allocation means, and an output means. The symbol transmission channel definition means is adapted to define at least two symbol transmission channels with each symbol transmission channel being formed by a sub-set of frequency bands selected from a set of frequency bands. The allocation means enables an allocation of each frequency band of a symbol transmission channel to a symbol value of the set of symbol values in a one-to-one relation such, that the symbol transmission channels defined differ from each other in at least one frequency band selected and/or in an allocation of a frequency band to a symbol value. The output means outputs a control signal to an oscillator, whereby the control signal is adapted to adjust the oscillator frequency to the centre frequency of the frequency band used for modulating a respective symbol transmission channel The described method and conversion controller enable a new form of Frequency Shift Keying with improved frequency diversity and improved interference diversity.

To achieve a frequency hopping with a situation related optimum frequency diversity, a usage order is defined for modulating the defined symbol transmission channels, and each symbol transmission channel is preferably modulated successively according to the defined usage order.

The defined symbol transmission channels are further advantageously reused for effecting a modulation with symbol values of the digital message upon the number of symbols in the digital message exceeding the number of defined symbol transmission channels. Usually the defined symbol transmission channels are hereby reused in the order used for modulating the defined symbol transmission channels with the first symbol values of the digital message, but as sometimes conflicts may arise with co-located communication systems using the same set of frequency bands, the defined symbol transmission channels may also be reused in an order different to the order used for modulating the defined symbol transmission channels with the first symbol values of the digital message.

Particularly when implementing the present invention in an ultra-wideband communication system, the modulation of a defined symbol transmission channel with a single symbol value is effectively effected by up-converting a baseband shaped pulse signal to the frequency band of the respective symbol transmission channel which is allocated to the respective single symbol value. The bandwidth of the baseband shaped pulse signal corresponds hereby preferably to the bandwidth defined for the frequency band to which it is up-converted.

To enable the use of baseband signals of constant bandwidth, the bandwidths of any two frequency bands of the set of frequency bands are preferably set to be substantially identical. If emphasis put on obtaining constant autocorrelation properties for all frequency bands, then the fractional bandwidths of any two frequency bands of the set of frequency bands are effectively kept substantially identical.

The possibilities for modulation can be enhanced by further defining at least two sub-channels for a frequency band of the set of frequency bands such, that the phase angles of any two sub-channels defined for a frequency band are different. This is effectively achieved with the symbol transmission channel definition means of the conversion controller comprising a sub-channel definition means for defining at least two sub-channels with different phase angles for each frequency band and further with the output means being adapted to control the phase of an oscillator according to the phase angle defined for a sub-channel.

BRIEF DESCRIPTION OF THE DRAWINGS

In the following description, the present invention is explained in more detail with respect to special embodiments and in relation to the enclosed drawings, in which.

DETAILED DESCRIPTION OF THE INVENTION

Figure 1:
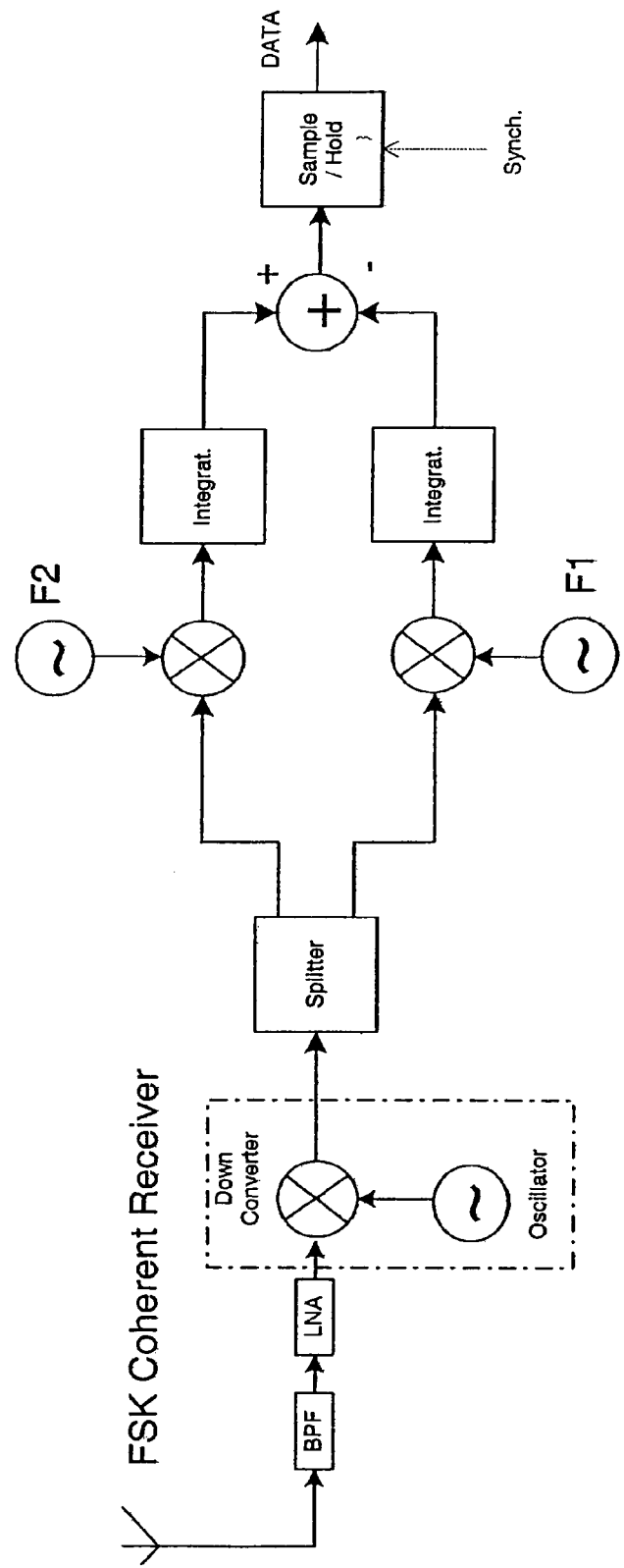
FIG. 1 shows a block diagram of a typical coherent receiver for frequency shift keying.
Figure 2:
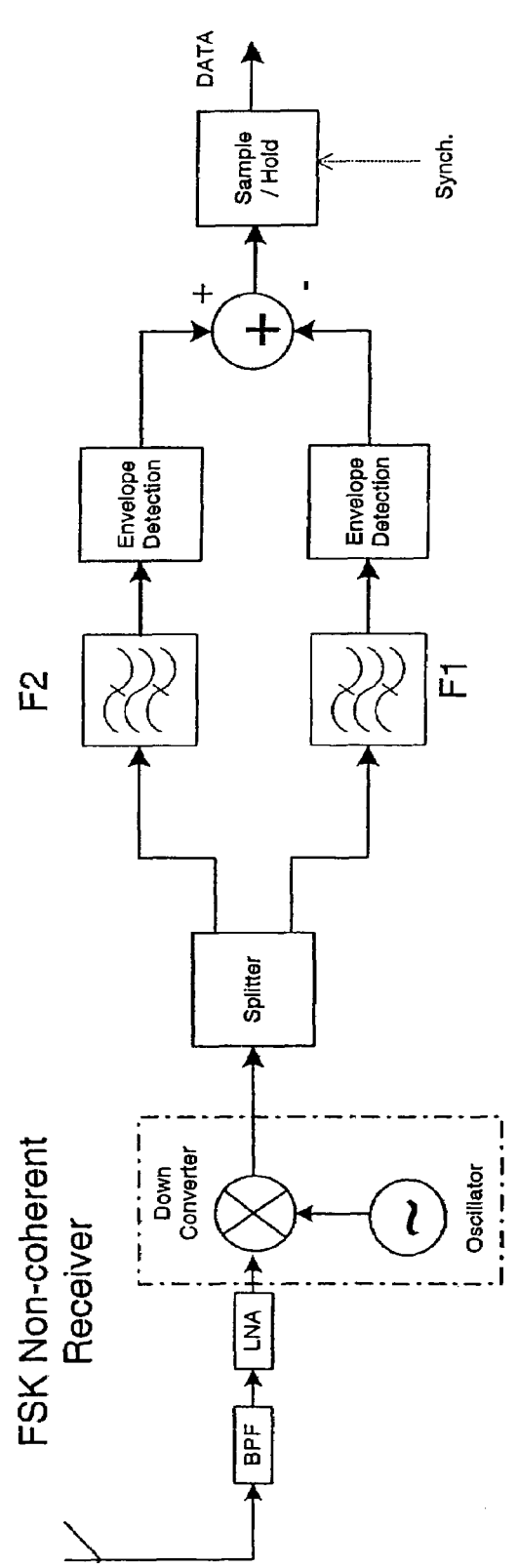
FIG. 2 shows a block diagram of a non-coherent receiver for frequency shift keying.

In multi-band modulation systems more than one carrier frequencies are used for imprinting a digital message on a signal carrier. An example for a prior art frequency 30 allocation scheme used in a Binary Frequency Shift keying modulation (BFSK) with two carrier frequencies F1 and F2 is given in Table 1 below. It is hereby assumed, that a digital message is organised in frames, with each frame containing a defined number of symbols having a symbol period $T_S$.

TABLE 1

Allocation scheme for a conventional binary FSK modulation

| Symbol Value ↓ | Frame 1 | | | | Frame 2 | | | |
|---|---|---|---|---|---|---|---|---|
| '0' | F1 | F1 | F1 | F1 | F1 | F1 | F1 | F1 |
| '1' | F2 | F2 | F2 | F2 | F2 | F2 | F2 | F2 |
| Time → | $T_s$ | $2 T_s$ | $3 T_s$ | $4 T_s$ | $5 T_s$ | $6 T_s$ | $7 T_s$ | $8 T_s$ |

Unlike in the prior art, the present invention changes the assignment of a symbol value to a particular frequency band from one symbol period to the next. This is achieved by defining a set of n-tuples wherein each n-tuple relates a number of n different frequency bands in a unique way to the n permissible symbol values. The different n-tuples of the set are then used successively for modulating the symbols of a digital message. The number of n-tuples in the set corresponds preferably to the frame size, i.e. to the number of symbols contained in a frame. Upon modulating a digital message, the usage of the defined set of n-tuples is then repeated for each frame, so that the frequency bands are practically put in a staggered arrangement. A respective Frequency Shift Keying modulation is therefore referred to as Frequency Staggered Frequency Shift Keying (FS-FSK).

The set of frequency bands in each n-tuple represents a sub-set of the set of frequency bands being totally available for a modulation of a digital message. An n-tuple being composed of a sub-set of frequency bands and the allocation of these frequency bands to a single symbol value is in the ongoing referred to as a symbol transmission channel.

An example for a frequency allocation scheme of an FS-FSK according to the present invention is given in Table 2. The scheme uses a 2-ary FSK, whereby 'M'=2 specifies the number of frequency bands of a symbol transmission channel and not the total number of frequency bands used for the modulation. The frame size 'N' in the example is equal to 4 symbols and the total number of frequency bands 'C' used for a modulation amounts to 8 so that the condition C=M·N is obeyed. Each symbol period has a duration of $T_S$ seconds, and the eight different frequency bands are denoted as F1, F2, F3, F4, F5, F6, F7, and F8.

TABLE 2

First allocation scheme example of a 2-ary FS-FSK modulation

| Symbol Value ↓ | Frame 1 | | | | Frame 2 | | | |
|---|---|---|---|---|---|---|---|---|
| '0' | F1 | F3 | F5 | F7 | F1 | F3 | F5 | F7 |
| '1' | F2 | F4 | F6 | F8 | F2 | F4 | F6 | F8 |
| Time → | $T_s$ | $2 T_s$ | $3 T_s$ | $4 T_s$ | $5 T_s$ | $6 T_s$ | $7 T_s$ | $8 T_s$ |

According to the allocation scheme illustrated in Table 2, if the first symbol value at the symbol period $T_S$ in the first data frame 'Frame 1' is '0', frequency band F1 is activated, i.e. a signal is only present on this frequency band and only for that time period. In the other case of the symbol value being '1', the frequency band F2 is activated. In the second symbol period $2T_S$, F3 is activated for a symbol value of '0' and F4 correspondingly for a '1'. In symbol period $3T_S$, the respective frequency bands activated are F5 or F6, and in the next following symbol period F7 or F8. The explained allocation scheme is repeated for the next and the further following data frames.

Although the condition C=M·N is met in the example shown, FS-FSK can likewise be implemented with C<M·N as well as C>M·N. An example for C<M·N is shown in Table 3. Since the number C of four frequency bands in this example is less than the product of the available M=2 symbol values and the frame size of N=4 symbols, The four frequency bands are used twice within one frame. The allocation of the frequency bands to a certain symbol value is hereby not fixed but changes with the usage of a frequency band in a different symbol transmission channel, i.e. primarily with the order it is used for modulating the symbols in a frame. In the example illustrated in Table 3, frequency band F1 is e.g. used to represent a '0' symbol value for a first symbol in a frame and to represent a '1' symbol value for a last symbol in a frame.

TABLE 3

Second allocation scheme example of a 2-ary FS-FSK modulation

| Symbol Value ↓ | Frame 1 | | | | Frame 2 | | | |
|---|---|---|---|---|---|---|---|---|
| '0' | F1 | F2 | F3 | F4 | F1 | F2 | F3 | F4 |
| '1' | F4 | F3 | F2 | F1 | F4 | F3 | F2 | F1 |
| Time → | $T_s$ | $2T_s$ | $3T_s$ | $4T_s$ | $5T_s$ | $6T_s$ | $7T_s$ | $8T_s$ |

An example for a 4-ary FS-FSK modulation on base of a frame size of three symbols is given in Table 4. In total twelve frequency bands F1 to F12 are used for modulation. The symbol period of each symbol is again set to t=$T_S$, and the selection of frequency bands is repeated in the same order for every frame.

TABLE 4

Allocation scheme example for a 4-ary FS-FSK modulation

| Symbol Value ↓ | Frame 1 | | | Frame 2 | | |
|---|---|---|---|---|---|---|
| '00' | F1 | F5 | F9 | F1 | F5 | F9 |
| '01' | F2 | F6 | F10 | F2 | F6 | F10 |
| '10' | F3 | F7 | F11 | F3 | F7 | F11 |
| '11' | F4 | F8 | F12 | F4 | F8 | F12 |
| Time → | $T_s$ | $2T_s$ | $3T_s$ | $5T_s$ | $6T_s$ | $7T_s$ |

Instead of using a fixed order of frequency bands for each frame, the order of frequency bands may be changed from frame to frame. This is e.g. done by rotating the order of frequency bands from frame to frame, preferably such that a fixed frequency offset is achieved for a frequency band of a symbol transmission channel in a current frame to the corresponding frequency band used in the corresponding symbol transmission channel of the previous frame. But other mapping schemes may be used instead, i.e. schemes that alter the assignment of frequency channels to symbol values for the various symbol transmission channels from frame to frame. The mapping schemes used are hereby preferably geared to achieve a minimum adjacent channel interference and/or crosstalk between different communication systems using the same or part of the same signal transmission channel as defined by the sum of the frequency bands employed. A respective FS-FSK modulation combines the advantages of Frequency Shift Keying with that of frequency hopping, and by further modifying the set of symbol transmission channels from frame to frame, the spacing between the frequency bands in each set of symbol transmission channels is modified from one symbol period to the next.

It is to be noted, that the proposed Frequency Staggered FSK modulation can be used in combination with any form of conventional Frequency Shift Keying method, like for instance Continuous FSK, Sunde's FSK, Orthogonal FSK and the like. The overall bandwidth required for a digital message is hereby proportional to the number C of frequency bands and depends further on the spacing of the single frequency bands used.

An FS-FSK modulation is preferably used in Ultra Wide Band (UWB) communication systems.

UWB systems are systems, which use extremely large bandwidths. In the past, such systems were only used in military applications. However in 2002, the Federal Communications Commission (FCC) in the US allowed the use of the 3.1-10.6 GHz band for commercial ultra-wideband applications. Furthermore, the FCC defined that an ultra-wideband signal must occupy at least 500 MHz bandwidth or have a fractional bandwidth greater than 0.25. UWB communication systems offer a very high data rate of more than 110 Mbps over a short range of about up to 10 m for broadband wireless applications including wireless multimedia stream or wireless video connection. To generate such large bandwidths of up to 7.5 GHz, various methods exist including short pulse, chirp modulation, frequency hopping and the like.

Figure 3:
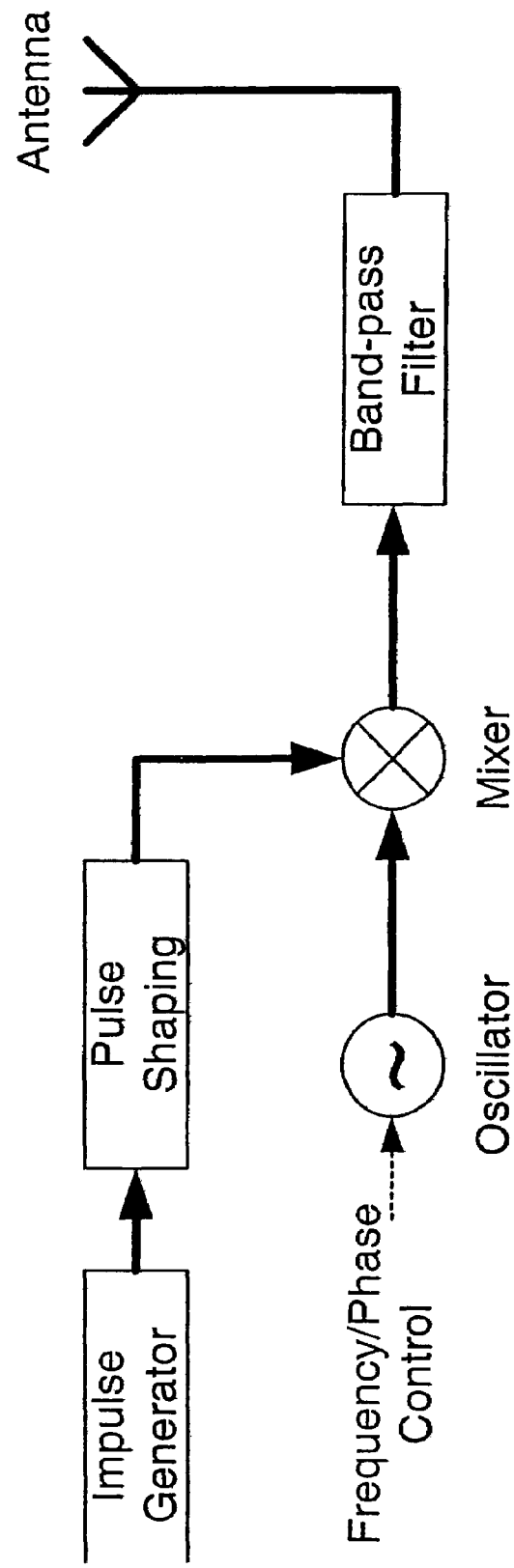
FIG. 3 shows a block diagram of a multi-band Ultra Wide Band (UWB) transmitter.

Typical pulse generated ultra-wideband systems transmit a short pulse followed by a gap with no transmission until the next pulse is sent. The rate at which the pulses including the subsequent time gap between pulses are sent is known as the pulse repetition frequency (PRF). If the pulses of such a UWB system occupy one very broad band (from 500 MHz to 7.5 GHz), these systems are called Single-Band UWB Systems. If the pulses occupy several smaller bands of more than 500 MHz, these systems are called Multi-Band UWB systems The block diagram of FIG. 3 shows an example for a multi-band UWB transmitter. An impulse generator provides impulses to a pulse shaping filter, which is e.g. implemented using a low-pass or band-pass filters. The output of the pulse-shaping filter is a pulse shaped impulse signal. The mixer up-converts the pulse shaped impulse signal to the desired frequency band with the respective operating centre fre quency. The bandwidth of a UWB signal at the output of the mixer is determined by the bandwidth of the pulse-shaping filter. The centre frequency as well as the instantaneous phase of the UWB signal can be controlled via oscillator control. A RF-band-pass filter is used at the output of the mixer to reject undesired or out-of-band frequencies and/or mixer products prior to a transmission via an antenna. A more detailed description of an UWB transmitter is e.g. given in U.S. Pat. No. 6,026,125

The adjustable centre frequency of the oscillator shown in FIG. 3 enables an implementation of a UWB communication system employing frequency hopping. The example impulse response of the pulse-shaping filter in FIG. 3 is similar to a Gaussian window. Mathematically a Gaussian window w(t) is defined as:

$$w(t) = e^{-\frac{t^2}{2\sigma^2}} \quad (1)$$

with t=0 defining the centre of the pulse window and σ the standard deviation.

To prepare a baseband signal for being up-converted to a particular frequency band, the baseband signal is usually multiplied with a sine wave having a frequency which corresponds to centre frequency of the respective frequency band. In a multi-band UWB communication system, the sine wave is multiplied with a Gaussian window according to equation (1) which results in a pulse signal on the corresponding frequency band. This mixing is mathematically described by the following equation:

$$x(t)=s(t) \cdot w(t) \quad (2)$$

wherein s(t)=sin(2πft) and $$w(t) = e^{-\frac{t^2}{2\sigma^2}}.$$

x(t) denotes the signal at the output of the mixer, s(t) is the adjustable sine wave oscillator frequency, and w(t) represents the Gaussian window as defined in equation (1).

Figure 4:
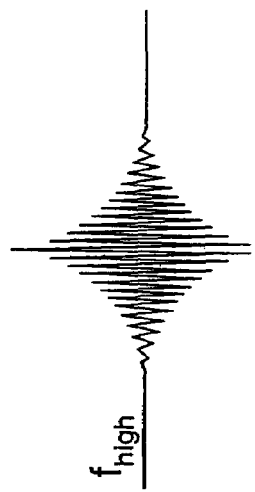
FIG. 4 shows pulses of a UWB system with different centre frequencies.
Figure 4:
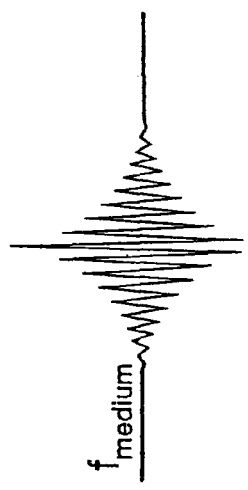
Figure 4:
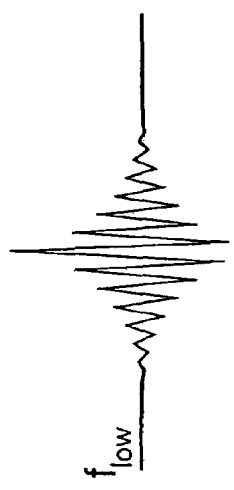

In case of fixed bandwidth the standard deviation σ of a Gaussian window is the same for all frequency bands. In FIG. 4 three up-converted pulses with different centre frequencies $f_{low}$, $f_{medium}$, and $f_{high}$ are shown. These pulses can be observed between the mixer and the band-pass filter of FIG. 3. Since all of the three pulses have the same duration, all of them are occupying the same bandwidth at different frequencies. Those pulses with equal length are used in a system with sub-bands of a fixed bandwidth.

Alternatively, frequency bands with different bandwidth but constant fractional bandwidth can be used. A fractional bandwidth of a frequency band is defined by the bandwidth of the frequency band normalised to its centre frequency. Keeping the fractional bandwidth of the frequency bands constant results in a higher bandwidth for frequency bands with higher centre frequency so that the autocorrelation properties of a signal transmitted over a frequency band does not change with the frequency band used.

Figure 5:
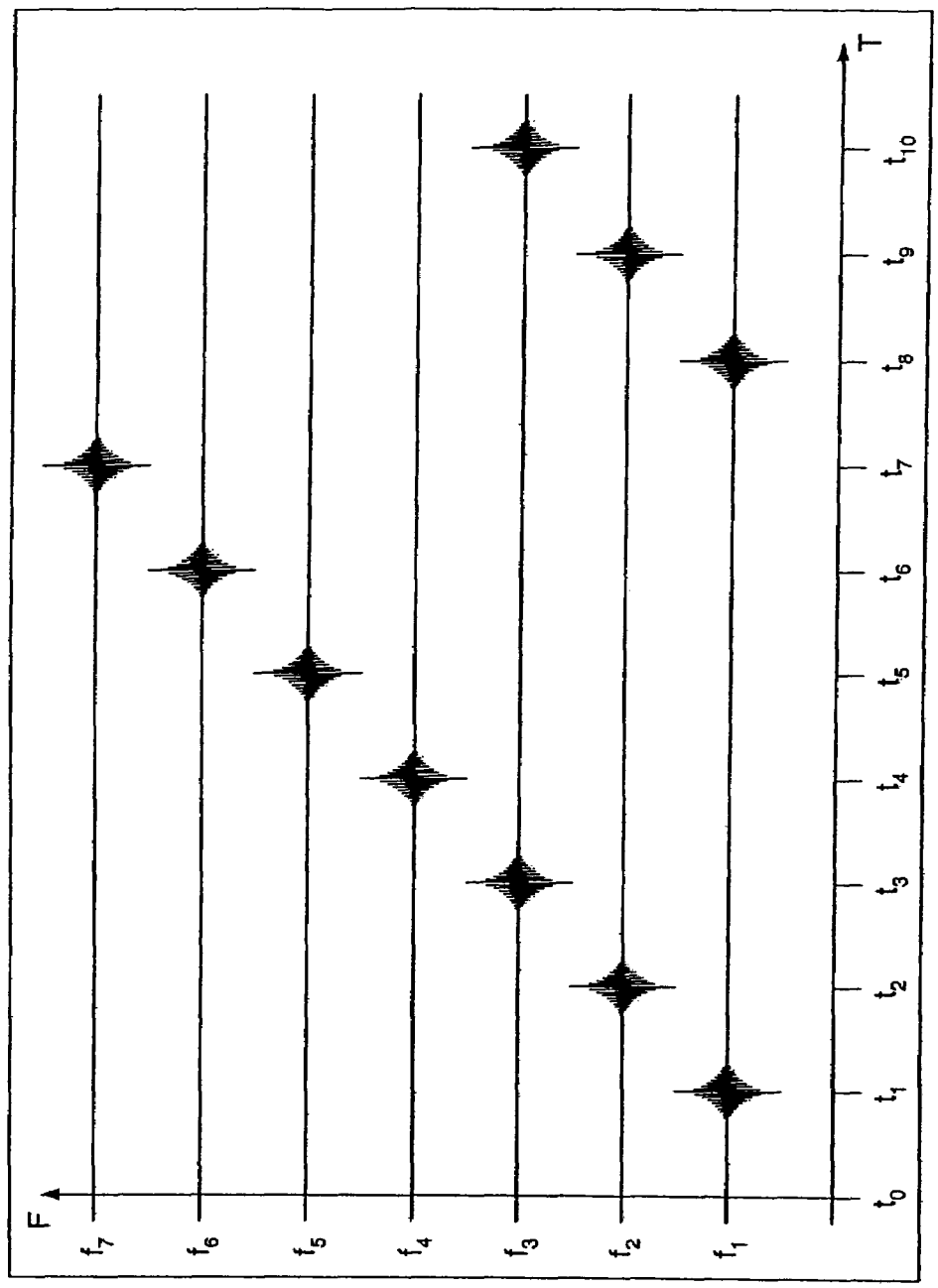
FIG. 5 shows a pulse transmission order according to the prior art.

In a typical prior art multi-band communication system, only one pulse at a time is up-converted on a frequency band, which is shown for 7-frequency band transmission channel in FIG. 5. The symbols of a digital message are usually modulated in a bipolar manner, which means that a symbol transmission channel contains two different frequency bands, one for modulating the first, the other for modulating the second symbol value as e.g. shown in FIG. 6 for a 2ary-FS-FSK modulation based on a usage of a total of seven frequency bands.

Figure 6:
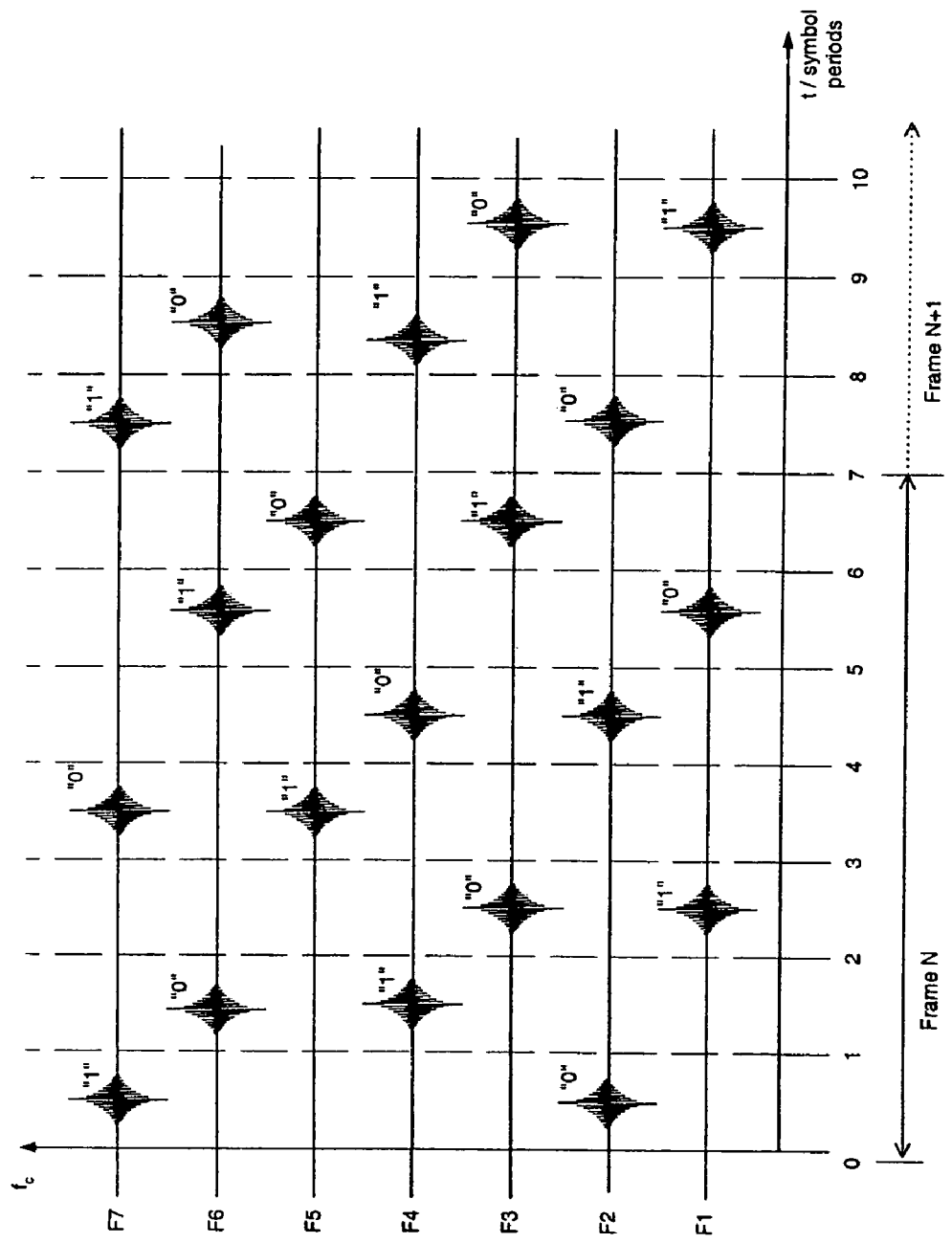
FIG. 6 shows an example of a symbol transmission channel definition for a set of seven frequency bands according to the present invention.

According to the example of FIG. 6, frequency band F1 of the first symbol transmission channel is activated for the first symbol in the first frame carrying the symbol value '1', and frequency band F2 for the symbol having a symbol value of '0'. The allocation scheme corresponding to the frequency activation scheme of FIG. 6 is summarised in Table 5.

TABLE 5

Allocation scheme example for a 2-ary FS-FSK modulation based on a frame size of seven symbols and seven different frequency bands (M = 2, N = 7, C = 7)

| Symbol Value ↓ | Frame 1 | | | | | | | Frame 2 | | | | | | |
|---|---|---|---|---|---|---|---|---|---|---|---|---|---|---|
| '0' | F2 | F6 | F3 | F7 | F4 | F1 | F5 | F2 | F6 | F3 | F7 | F4 | F1 | F5 |
| '1' | F7 | F4 | F1 | F5 | F2 | F6 | F3 | F7 | F4 | F1 | F5 | F2 | F6 | F3 |
| Symb. Transm. Channel | No. | No. | No. | No. | No. | No. | No. | No. | No. | No. | No. | No. | No. | No. |
| → | 1 | 2 | 3 | 4 | 5 | 6 | 7 | 1 | 2 | 3 | 4 | 5 | 6 | 7 |
| Time → | 1 | 2 | 3 | 4 | 5 | 6 | 7 | 1 | 2 | 3 | 4 | 5 | 6 | 7 |
| | $T_s$ | $T_s$ | $T_s$ | $T_s$ | $T_s$ | $T_s$ | $T_s$ | $T_s$ | $T_s$ | $T_s$ | $T_s$ | $T_s$ | $T_s$ | $T_s$ |

Figure 7:
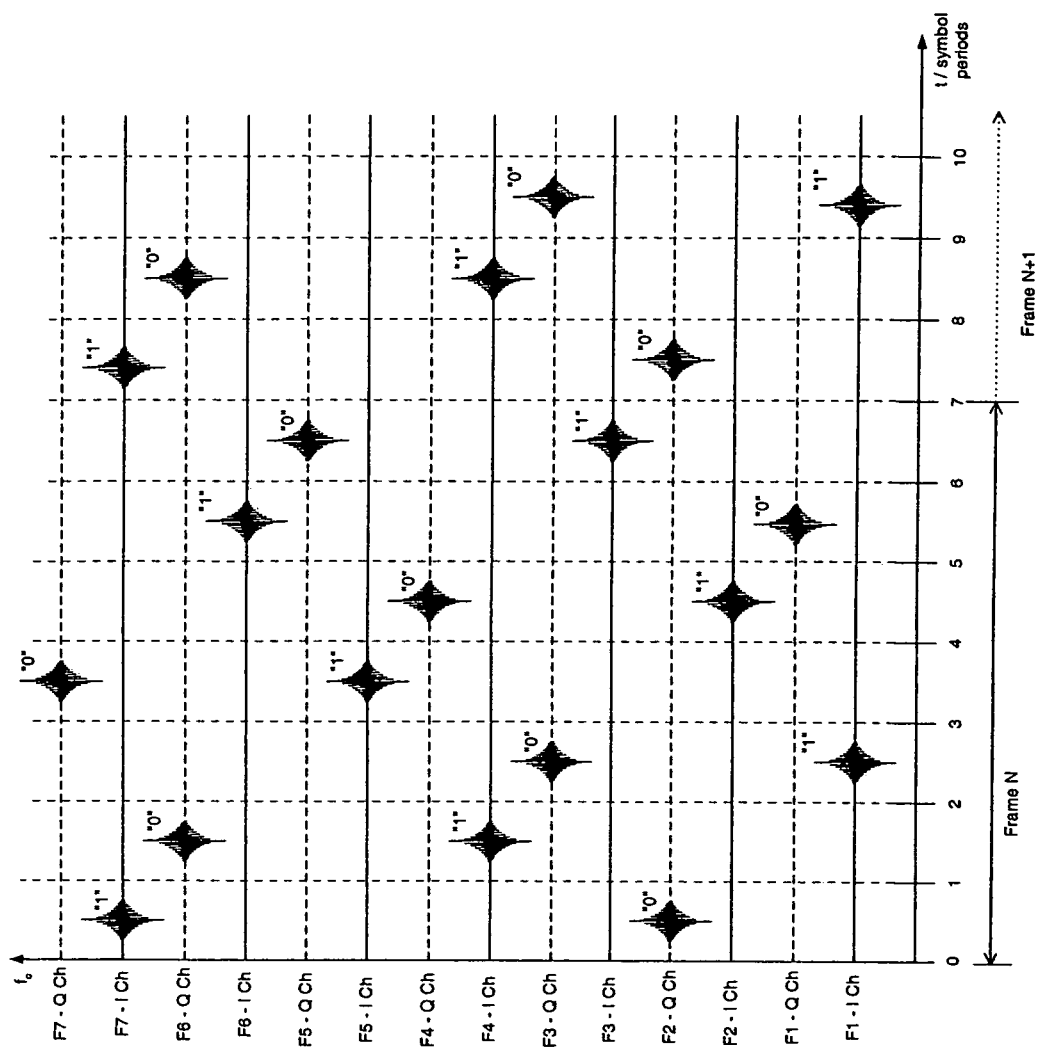
FIG. 7 shows a further example of a symbol transmission channel definition according to the present invention with sub-channels defined for each frequency band of the set of frequency bands.

The modulation possibilities of an FS-FSK system corresponding to the principles explained by example with reference to FIG. 6 and Table 5 can be extended by further introducing Phase Shift Keying (PSK) for conveying the information content, i.e. the succession of symbol values of a digital message. A 2-ary FS-FSK scheme according to FIG. 6 with a 2-PSK extension is shown in FIG. 7. In the example shown, the two phasings or phase angles, respectively, differ by π/2 radians defining an in-phase channel and a quadrate channel for each frequency band. A respective modulation scheme is called π/2 FS-FSK.

TABLE 6

Allocation scheme example for the π/2 FS-FSK of Figure 7

| Symbol Value ↓ | | | | Frame 1 | | | |
|---|---|---|---|---|---|---|---|
| '0' | F2 Q-Ch. | F6 Q-Ch. | F3 Q-Ch. | F7 Q-Ch. | F4 Q-Ch. | F1 Q-Ch. | F5 Q-Ch. |
| '1' | F7 I-Ch. | F4 I-Ch. | F1 I-Ch. | F5 I-Ch. | F2 I-Ch. | F6 I-Ch. | F3 I-Ch. |
| Symb. Transm. Channel → | No.1 | No.2 | No.3 | No.4 | No.5 | No.6 | No.7 |
| Time → | 1 $T_s$ | 2 $T_s$ | 3 $T_s$ | 4 $T_s$ | 5 $T_s$ | 6 $T_s$ | 7 $T_s$ |

In the example shown, a symbol value of '1' always activates an in-phase channel and a symbol value of '0' always a quadrate channel of a frequency band. The mapping of the symbol values in a frame according to FIG. 7 is summarised in the allocation scheme of Table 6, wherein Q-ch. stands for a quadrate channel and I-Ch. for a in-phase channel, respectively. The frequency spacing of the channels is thus improved as each channel of every frequency band is only used once within a data frame. Like above for a FS-FSK modulation, the allocation scheme may be repeated or modified from frame to frame. When the modification is organised in a deterministic manner, the definition of the symbol transmission channels and their successive order are known at the receiver side as soon as the receiver synchronised with the transmitter. If the modification of the symbol transmission scheme takes place in a non-deterministic way, e.g. in order to react to a crosstalk between two co-located UWB communication systems, the new order and/or definition of the single transmission channels may be exchanged as part of the digital message itself.

For implementing a FS-FSK or π/2 FS-FSK a conversion controller is proposed that controls the up-conversion frequency of an up-conversion oscillator in a FSK transmitter and, in the case of π/2 FS-FSK also the phase of the oscillator. On the receiver side, the conversion controller controls the mixing frequencies and phases of the oscillators used for down-converting the base-band signal. In case of a non-coherent receiver the conversion controller switches the band-path characteristics according to the symbol transmission channel used for a current symbol transmission.

The conversion controller comprises a symbol transmission channel definition means by which the symbol transmission channels intended to be modulated with the symbol values of the digital message are defined. Each symbol transmission channel is formed by a sub-set of frequency bands selected from the total set of available frequency bands. The symbol transmission channel definition means defines at least two different the symbol transmission channels.

The conversion controller further comprises an allocation means that defines the allocation of each frequency band in a symbol transmission channel to a symbol value of the set of symbol values in a one-to-one relation. The allocation is effected according to an allocation scheme which ensures, that the symbol transmission channels defined differ from each other in at least one frequency band selected and/or in an allocation of a frequency band to a symbol value.

For effecting a FS-FSK modulation or demodulation, the conversion controller further comprises an output means for outputting a control signal to an oscillator, whereby the control signal is adapted to adjust the oscillator frequency to the centre frequency of the frequency band used for modulating a respective symbol transmission channel.

In case of the FS-FSK being combined with Phase Shift Keying like for a π/2 FS-FSK modulation/demodulation as explained above, the symbol transmission channel definition means is further equipped with a sub-channel definition means that defines two or more sub-channels on each frequency band such, the phase angles defined for the sub-channels are different. Preferably only two sub-channels are defined for a binary digital signal with the phase angle corresponding to π/2, and the sub-channels are defined for each frequency band independent of its respective use in different symbol transmission channels. The output is then accordingly equipped with a phase control to not only control the frequency of an oscillator but also its phase with respect to the sub-channel used for modulating or demodulating a symbol value.

The proposed FS-FSK and its extended embodiment, the π/2 FS-FSK provide a simple modulation scheme, which is easy implemented in UWB communication systems. Only the frequency and/or phase controller for the oscillator is required to control the allocation scheme according to an embodiment of the present invention. While a FS-FSK receiver can be implemented as a coherent and a non-coherent receiver, a coherent receiver is required for a π/2 FS-FSK modulation system. The main advantages of both modulation methods according to present invention are the increased frequency diversity and the increased interference diversity achieved with the introduced frequency hopping. Thus the interference liability of cellular and multi-net operations can be reduced significantly.

The invention claimed is:

1. A frequency modulation method for imprinting a digital message formed by a sequence of symbols on a set of frequency bands, whereby each symbol is assigned one symbol value out of a defined set of symbol values, the method comprising:

defining at least two symbol transmission channels, each symbol transmission channel being formed by a sub-set of frequency bands selected from the set of frequency bands and each frequency band of a symbol transmission channel being allocated to a symbol value of the set of symbol values in a one-to-one relation, such that the symbol transmission channels differ from each other in at least one frequency band of the sub-set of frequency bands and/or in an allocation of a frequency band to a symbol value; and modulating each of the defined symbol transmission channels successively with a single symbol value of the digital message according to the allocation defined for the frequency bands of the respective symbol transmission channel, wherein modulation of a defined symbol transmission channel with a single symbol value is effected by up-converting a baseband shaped pulse signal to the frequency band of a respective symbol transmission channel which is allocated to a respective single symbol value.

2. A method according to claim 1, further comprising:

defining a usage order for modulating the defined symbol transmission channels; and modulating each symbol transmission channel successively according to the defined usage order.

3. A method according to claim 1, wherein the defined symbol transmission channels are reused for effecting a modulation with symbol values of the digital message upon the number of symbols in the digital message exceeding the number of defined symbol transmission channels.

4. A method according to claim 3, wherein the defined symbol transmission channels are reused in the order used for modulating the defined symbol transmission channels with the first symbol values of the digital message.

5. A method according to claim 3 wherein the defined symbol transmission channels are reused in an order different to the order used for modulating the defined symbol transmission channels with the first symbol values of the digital message.

6. A method according to claim 1, wherein the bandwidth of the baseband shaped pulse signal corresponds to the bandwidth defined for the frequency band to which it is up-converted.

7. A method according to claim 1, wherein at least two sub-channels are defined for a frequency band of the set of frequency bands such that the phase angles of any two sub-channels defined for a frequency band are different.

8. A conversion controller for a frequency shift keying transmitter and for a frequency shift keying receiver, the controller comprising:

symbol transmission channel definition means for defining at least two symbol transmission channels with each symbol transmission channel being formed by a sub-set of frequency bands selected from a set of frequency bands;

allocation means for allocating each frequency band of a symbol transmission channel to a symbol value of the set of symbol values in a one-to-one relation such, that the symbol transmission channels differ from each other in at least one frequency band of the sub-set of frequency bands and/or in an allocation of a frequency band to a symbol value; and output means for outputting a control signal to an oscillator, whereby the control signal is adapted to adjust the oscillator frequency to the centre frequency of the frequency band used for modulating a respective symbol transmission channel, wherein the symbol transmission channel definition means further comprises a sub-channel definition means for defining at least two sub-channels with different phase angles for each frequency band, and the output means is further adapted to control a phase of an oscillator according to the phase angle defined for a sub-channel.

9. A transmitter having a conversion controller according to claim 8.

10. A frequency modulation method for imprinting a digital message formed by a sequence of symbols on a set of frequency bands, whereby each symbol is assigned one symbol value out of a defined set of symbol values, the method comprising:

defining at least two symbol transmission channels formed by a sub-set of frequency bands selected from the set of frequency bands, each frequency band of each symbol transmission channel within one time frame being allocated to a symbol value of the set of symbol values in a one-to-one relation, such that the symbol transmission channels differ within one time frame from each other in at least one frequency band of the sub-set of frequency bands and/or in an allocation of a frequency band to a symbol value;

modulating each of the defined symbol transmission channels successively with a single symbol value of the digital message according to the allocation defined for the frequency bands of the respective symbol transmission channel;

rotating the allocation of the frequency bands to the symbol values for each time frame; and rotating the allocation of the frequency bands from frame to frame in such a way that a fixed frequency offset between the frequency band of a symbol transmission channel in a current time frame and the corresponding frequency band used in the corresponding symbol transmission channel of the previous time frame is achieved, wherein at least two sub-channels are defined for a frequency band of the set of frequency bands such that the phase angles of any two sub-channels defined for a frequency band are different.

11. A conversion controller for a frequency shift keying transmitter and for a frequency shift keying receiver, the controller comprising:

symbol transmission channel definition means for defining at least two symbol transmission channels with each symbol transmission channel being formed by a sub-set of frequency bands selected from a set of frequency bands;

allocation means for allocating within one time frame each frequency band of a symbol transmission channel to a symbol value of the set of symbol values in a one-to-one relation such that the symbol transmission channels within one time frame differ from each other in at least one frequency band of the sub-set of frequency bands and/or in an allocation of a frequency band to a symbol value; and output means for outputting a control signal to an oscillator, whereby the control signal is adapted to adjust the oscillator frequency to the centre frequency of the frequency band used for modulating a respective symbol transmission channel, wherein the allocation means rotates the allocation of the frequency bands to the symbol values for each time frame and rotates the order of the frequency bands from frame to frame in such a way that a fixed frequency offset between the frequency band of a symbol transmission channel in a current time frame and the corresponding frequency band used in the corresponding symbol transmission channel of the previous time frame is achieved, and the symbol transmission channel definition means includes sub-channel definition means for defining at least two sub-channels with different phase angles for each frequency band.

* * * * *